United States Patent Office 3,508,683
Patented Apr. 28, 1970

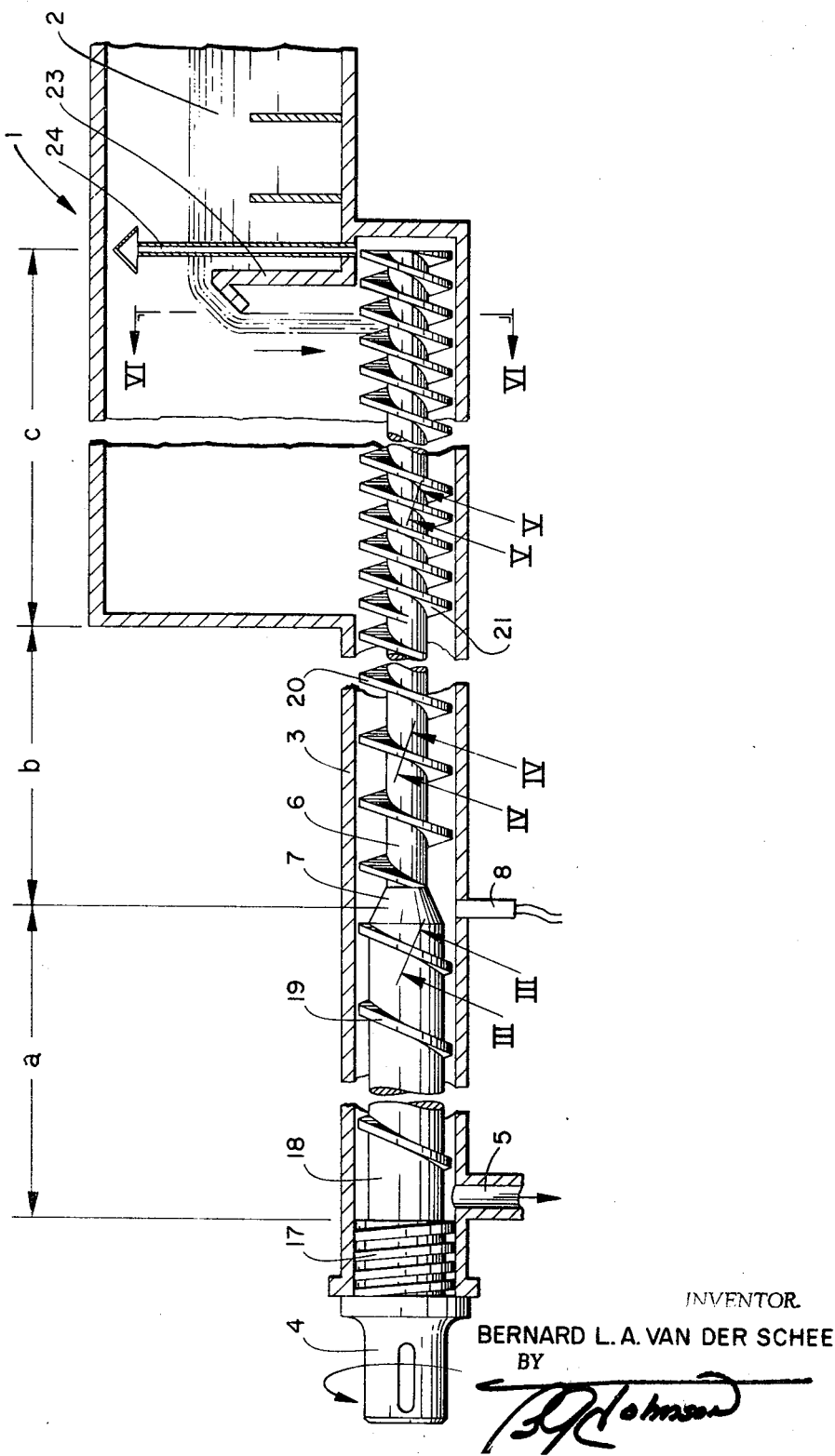

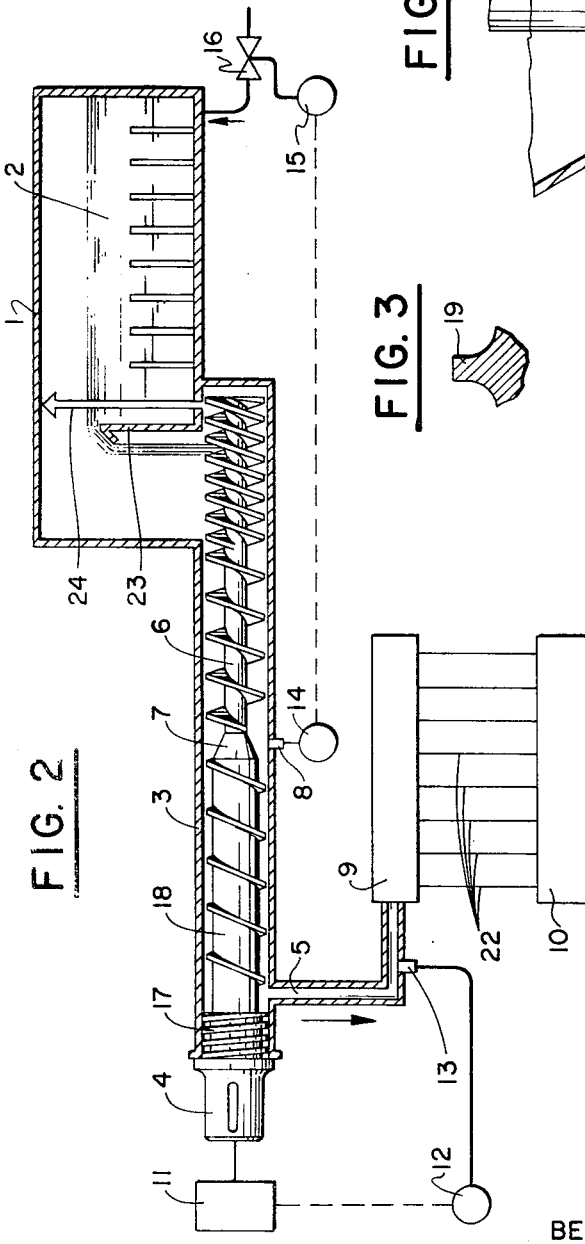
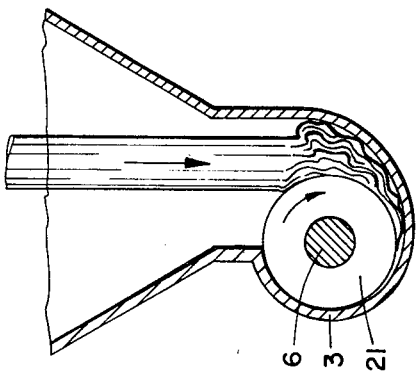
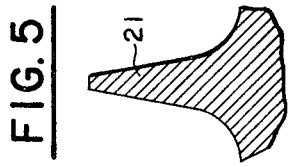
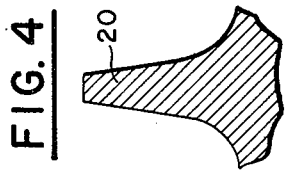
INVENTOR.
BERNARD L.A. VAN DER SCHEE

3,508,683
METHOD AND APPARATUS FOR TRANSPORTING A HIGHLY VISCOUS LIQUID FROM A VACUUM CHAMBER
Bernard L. A. van der Schee, Velp, Gelderland, Netherlands, assignor to American Enka Corporation, Enka, N.C., a corporation of Delaware
Filed Mar. 27, 1968, Ser. No. 716,476
Claims priority, application Netherlands, Apr. 7, 1967, 6704932
Int. Cl. B67d 5/08
U.S. Cl. 222—55
8 Claims

ABSTRACT OF THE DISCLOSURE

Method and apparatus for conveying under pressure a highly viscous liquid such as high molecular weight thermoplastics and the like comprising screw conveying means mounted in a suitable housing, said means comprising a plurality of sections with each of said sections having a liquid conveying channel therein, the depth of the channel being different in each section and with the depth of the channel in the first two sections being three to four times greater than that of the last section. The height of the conveying channel defined by the shaft of the conveyor and the flights is three to four times greater at the intake end than at the discharge end. Means are also provided for controlling the mount of liquid being conveyed.

---

The invention relates to a method and apparatus for transporting highly viscous liquids such as higher molecular weight liquid thermoplastics and the like from a vacuum chamber or a chemical reactor under pressure to a discharge opening or flow line feeding to other equipment or the like.

The invention comprises, broadly, a screw conveyor or extruder apparatus rotatable in a housing which is for the most part concentrically located thereabout. Very little clearance is provided between the screw conveyor and the housing and the conveyor is driven at its high-pressure end and is made up of a number of separately defined sections. The last section of the conveyor, when viewed in the direction of liquid flow, has a feed channel with lesser depth than the preceding section. An apparatus of this general type is rescribed in applicant's British patent specification 34,838 although the apparatus described in the patent is shown as being mounted vertically.

An improved apparatus of the type shown in the patent has now been found. The apparatus can be mounted horizontally as well as vertically and perhaps more importantly, significant improved results are achieved with the new design herein disclosed. The extruder or conveyor screw of the apparatus of the present invention is composed of three major sections, the first of which is of the multiple, helical flight type with the second and third sections being of the single flight type. As will be observed in the ensuing description, it is preferred that the feed channel depth or depth of the space between the upstanding flights in the conveyor's first two sections be three to four times greater than that of the last section. Should the apparatus be mounted to provide for horizontal flow, the housing for the conveyor also should preferably be elongated and it should extend almost entirely along the conveyor's length. The liquid being transported is pressed into the space between the conveyor's upstanding helical flights or, alternatively, the screw's feed channel. Hence, the screw's channel is filled under the influence of mechanical force and not by gravity. The first section not only is constructed to fill the screw's channel, but also is constructed to effect axial transport of the liquid. It has been found that the latter function can best be fulfilled should the housing closely envelop the screw along at least half of its circumference in this section. Equally as important, the section should be a screw of the multiple, helical flight type.

It has been found that when the first section is advantageously provided with a unique degassing aperture liquid transport is also greatly facilitated. The opening is constructed to function when there is a sudden influx of a large amount of liquid and even when the inlet opening proper is filled completely. It has been observed that entrained gas, such as gases in the form of bubbles and the like, will all too often collect in the channel between the flights blocking passage for the liquid. As a result, the transporting capacity of the screw will be significantly reduced, a highly undesirable situation in processes to which the invention pertains.

Subject to the provisions of the present invention, gas may now efficiently escape through the novel degassing opening located at a position of the screw's conveyor where the lowest possible pressure prevails. This position is found in the apparatus at the extreme end of the screw's first section. To ensure the fact that the opening be incapable of clogging, it should be relatively large in diameter and lead in an upward direction.

It is also preferred that the flight of the screw be interrupted at the point of transition from the second to the last section and a pressure pickup or sensor be provided. The sensor should be positioned at this so-called point of transition. The pressure sensor will produce a signal proportional to the degree in which the second section is filled and thus the operation of the apparatus can be monitored effectively.

During operation, the third section will be entirely filled with liquid, and in the first section the screw's channel (space between the flights) will, at no point, be entirely filled. In the second section there will also be a zone wherein the screw's channel is not entirely filled, followed by a zone in the same section in which the channel is full. The length of this last-mentioned zone in the section will in each case determine the amount of pressure measured by the pressure sensor.

The interruption between flights at the transition point (located between the second to the third section) has the considerable advantage in that a practically constant pressure signal will for the most part be produced. The signal will not be disturbed by pressure pulses being produced, for example, by the turning of the screw and wherein a flight thereof continuously passes the sensor.

The length of this zone in the second section is also a good measure of the level of the liquid in the vacuum chamber from which the screw conveyor is fed. With the aid of the reading of the pressure, proper liquid level in the chamber can be monitored and even controlled.

The pressure sensor or pickup, in a particularly useful embodiment, can be included as part of a control system which controls the liquid supply to and/or the discharge from the vacuum chamber. In the detailed description to follow it will be clear that the length of the filled zone in the screw's second section is dependent both on the rate at which liquid is fed to the vacuum chamber and on the rate at which liquid is discharged from the apparatus. The control of liquid flow through the vacuum chamber and, for that matter, through the conveying apparatus can, according to the invention, be controlled very accurately. It is preferred to use the conveyor in a manner so that the discharge of liquid at the pressure end and the speed of the screw are set at values which keep the second half of the second section almost entirely filled with liquid being transported.

The present apparatus offers significant advantages over conventional types of level gauges because of the short residence time of the liquid in the present means of determining volume and flow. Moreover, the presence of dead pockets forming stagnant decomposed material is avoided; furthermore, since a screw for transporting the liquid must be provided, no additional expensive parts are necessary.

The dimensions of the second and third sections may be calculated by known methods. The dimensions of the second section are determined by the desired pressure signal in combination with the buffer volume of liquid that is in the section. The dimensions of the third section are determined mainly by the delivery pressure and the transporting capacity required.

Ancillary objects and advantages will be more apparent from the drawing and the detailed description thereof in which:

FIGURE 1 is an illustration, partly in section, of the screw conveying apparatus with its arrangement relative to a vacuum tank.

FIGURE 2 shows, schematically, a complete processing plant utilizing the screw conveyor of the invention. The conveyor an vacuum tank are, again, partly in section.

FIGURES 3, 4 and 5 illustrate the cross sections of the various segments of the upstanding flights utilized.

FIGURE 6 is a cross-sectional view taken along VI—VI in FIGURE 1.

In FIGURE 1 numeral 1 refers to a vacuum tank, which can serve as the last reactor of an apparatus utilized, for example, in the continuous polycondensation of thermoplastic polyethylene terephthalate. Numeral 2 refers to the polymer mass passing through the apparatus. By way of overflow 23, there is attached to the tank a cylindrical housing 3 in which screw conveyor 4 is mounted for powered rotation. Extruder or screw conveyor 4 extends into the vacuum chamber portion of reactor tank 1. Provided in housing 3 near the screw's end, which is opposite to the end extending into the vacuum tank, is outlet 5 through which polymer or the like may be discharged under pressure.

The extruder screw is to be considered as being divided into three sections along its length. The sections are shown in FIGURE 1 by the reference characters a, b and c. In sections b and c, the shaft of the screw is thin (relatively narrow in diameter) and the screw channel (depth of the space between the flights) consequently is very deep. In section c the shaft 6 is provided with a double flight and in section b, single flight. Between the sections a and b the shaft diameter is increased by way of a cone or inclined surface 7. No upstanding helical flights are located at 7. In section a the screw is of the single flight type and has a small channel depth.

Provided in housing 3 facing cone 7 is a pressure sensing means or pickup 8. The pickup is of conventional design and can be of the type manufactured by Statham Instr. Inc. and is identified as strain gage pressure transducer. The pickup is adapted to transmit the measured pressure in the form of an electric signal. As will be appreciated by those skilled in the art to which this invention pertains, construction is also conceivable wherein the measured pressure is transmitted pneumatically. Left of outlet 5, the screw shaft is provided with a fine thread that runs in a direction opposite to the direction of the flights in the sections a, b and c. This thread arrangement serves the purpose of providing a seal against polymer leakage at the screw conveyor's driving end.

FIGURE 2 shows schematically a part of a complete plant that can be utilized, for example, for continuous polycondensation and shaping of polyethylene terephthalate. The apparatus can, for example, include means for spinning and winding of filaments or threads. The polymer is passed from the last reactor vacuum tank 1 with the aid of extruder 4 through pipe 5 to a spinning machine 9. The spinning machine extrudes and forms the polymer into multifilaments or thread-like bodies 22, which subsequently are wound by winding machine 10.

The conveyor screw is driven by motor 11, the speed of which is controlled with the aid of a pulse source 12 which responds to the pressure in pipe 5. The pressure is registered by a pressure pickup 13. Pickup 13 can be of the same general type of pickup 8. Likewise, at the cone-shaped portion of the stem 7 the pressure pickup 8 and the pulse source 14 transmit an electric or, if preferred, a pneumatic signal to controller 15 and thence to control valve 16. Valve 16 controls the amount of polymer supply to reactor 1. As the pressure measured by the pickup 8 decreases, the valve 16 is opened further, and conversely.

Also indicated in FIGURE 1 are shaft 18 in section a and the flights 19, 20 and 21 in the sections a, b and c. The flights are shown in cross section on an enlarged scale in the FIGURES 3, 4 and 5. The views thereof are taken along lines III—III, IV—IV and V—V, respectively, of FIGURE 1.

As perhaps can best be seen from FIGURE 1, liquid 2 flows over the overflow lip of reactor 1 and falls freely down between the flights of the screw. FIGURE 6 shows this section of the screw in cross section along VI—VI in FIGURE 1. It can be seen that the housing 3 and the screw 21 form a wedge-shaped slot, as a result of which the wall of the housing presses the liquid between the flights of the screw. Along the second half of the housing 3 the slot between the screw and the housing is so narrow that the liquid is transported in axial direction.

FIGURES 1 and 2 show that the free end of the screw reaches into a dead end of the housing 3. Connected to the housing at that point is degassing conduit 24, which passes through and above the level of liquid 2. In this manner, the liquid being transported by the conveyor is prevented from being blocked by a gas bubble since the gas from the screw passes freely out of the apparatus.

In the screw shown in the figures in the length of the sections a, b and c measures, for example, about 625, 300 and 250 mm., respectively. The diameter of the screw housing is 45.0 mm. The shaft diameter in section a is 38 mm. and in sections b and c 21 mm. Along the entire length of the sections a, b and c the outside diameter is 44.7 mm., so that the radial clearance is 0.15 mm. In section a the pitch of the screw is 55 mm. and in sections b and c it is 45 mm. As stated previously, the screw in section c is of the double flight type.

If it is desired to measure the pressure at a plurality of points along the length of the screw, for instance in section a, it is preferred to interrupt the flight of the screw at the point or points where a pressure sensing means is to be positioned.

EXAMPLE

The above-described screw was used for transporting polyethylene terephthalate having a melt viscosity of 16,000 poises. The speed of the screw was set to transport the polymer at 175 cm.$^3$/min. The pressure in the outlet pipe 5 was measured and found to be 255 kg./cm.$^2$. Under these conditions it was observed that only approximately the left half of section b of the screw was entirely filled with liquid. This means that this section was filled with 190 cubic centimeters of polymer. The polymer pressure registered by the pressure pickup 8 at cone 7 was on an average 20 bars (=about 20 kg./cm.$^2$).

The degree in which section b was filled was changed by varying the polymer stream. The length of the entirely filled zone of section b varied between 60 and 260 mm. This was found to correspond to a variation from 5 bars to 35 bars in the pressure measured by the pressure pickup 8. This illustrates the high sensitivity of the pickup and the attendant means to control the degree in which section b is filled. It was found possible to use the signal (caused by variations in pressure detected by the pressure pickup 8) for transmitting pulses to the feed control valve 16 for the effective control of the amount of polymer being fed to the reactor 1. In this way a very uniform pressure level at the outlet opening 5 can be realized.

The total liquid capacity of section $b$ was 370 cm.³. This corresponded to a residence time of the liquid stream of 2.1 minutes. This buffer volume was found amply sufficient to compensate for irregularities in the liquid stream.

Also the control system was found to be quite stable in spite of the time lag between the inlet valve and the pressure pickup because of the presence of the reactor.

The process and apparatus of the invention are particularly applicable to all organic thermoplastic materials such as polyester, polyamides, polyurethanes and the like.

While preferred embodiments of the invention have been disclosed, the description is intended to be illustrative only, and it is to be understood that changes and variations may be made without departing from the spirit and scope of the invention as defined by the appended claims.

What is claimed is:

1. In an apparatus for transporting highly viscous liquids under pressure, the improvement, comprising in combination:
   (a) a conveyor screw rotatable in a housing and constructed to be driven at its discharge end;
   (b) said conveyor having a viscous liquid intake end;
   (c) said conveyor having a liquid conveying channel between the said intake and discharge ends, said channel being defined by the shaft of said conveyor and screw flights;
   (d) said conveying channel being composed of three sections, the first section being at the intake end and containing a section of the conveyor screw which is of the multiple, helical flight type, the middle and discharge sections containing a section of the conveyor screw which is of the single flight type;
   (e) the depth of the space between the upstanding flights in the first and middle sections of said conveyor being from three to four times greater than that of the discharge section;
   (f) the distance between the screw flights increases from said intake end to said discharge end; and
   (g) the height of the conveying channel defined by the shaft of said conveyor and said flights is, at said intake end, three to four times greater than said channel at its discharge end.

2. Apparatus according to claim 1 wherein the conveyor is constructed of three differing screw flight sections, said conveyor having a point of transition between the middle and discharge section and positioned where the flight is interrupted.

3. Apparatus as defined in claim 2 wherein sensing means is provided at said point of transition, said sensing means being responsive to pressure in the housing.

4. Apparatus as defined in claim 3 wherein the pressure sensing means is included in a control system which regulates the supply of the liquid to the conveyor.

5. Apparatus as defined in claim 4 wherein the pressure sensing means is included in a control system which regulates the discharge of the liquid from the apparatus at its discharge end comprising the conveyor's last section.

6. Apparatus as defined in claim 2 wherein the screw conveyor is horizontally mounted and in that the housing has an elongated opening which extends along the length of a first section comprising the intake end, said opening comprising a wedge-shaped slot between the screw conveyor and said housing.

7. Apparatus as defined in claim 6 wherein there is provided, at the beginning of the conveyor's first section, a degassing opening.

8. In a method for transporting, by screw conveyor, a highly viscous liquid under pressure wherein said liquid is discharged at the discharge end where the pressure is the highest, the improvement wherein the pressure and the speed of said screw conveyor are set to maintain that portion of the screw conveyor immediately preceding the flight interruption at the end of the second section of a three section conveyor almost entirely full of the viscous liquid being transported.

References Cited

UNITED STATES PATENTS

| | | | |
|---|---|---|---|
| 2,142,984 | 1/1939 | Thurman | 198—213 |
| 2,369,553 | 2/1945 | Fields | 18—12 |
| 2,920,347 | 1/1960 | Joukainen | 18—12 |
| 3,150,214 | 9/1964 | Scalora | 18—12 |
| 3,357,049 | 12/1967 | Spindler | 18—2 |
| 3,422,748 | 1/1969 | Gilman | 18—12 |

RICHARD E. AEGERTER, Primary Examiner

U.S. Cl. X.R.

198—214